United States Patent [19]

Nomura

[11] Patent Number: 5,136,315
[45] Date of Patent: Aug. 4, 1992

[54] BARRIER APPARATUS OF CAMERA

[75] Inventor: Hiroshi Nomura, Tokyo, Japan

[73] Assignee: Asahi Kogaku Kogyo Kabushiki Kaisha, Tokyo, Japan

[21] Appl. No.: 629,707

[22] Filed: Dec. 18, 1990

[30] Foreign Application Priority Data

Jun. 1, 1990 [JP] Japan .................. 2-58108[U]

[51] Int. Cl.⁵ .................................. G03B 17/04
[52] U.S. Cl. ........................................ 354/187
[58] Field of Search ............ 354/187, 253, 202, 288, 354/273

[56] References Cited

U.S. PATENT DOCUMENTS

| | | | |
|---|---|---|---|
| 3,918,076 | 11/1975 | Shono | 354/219 |
| 3,978,503 | 8/1976 | Shono | 354/250 |
| 4,341,450 | 7/1982 | Shigoku | 354/273 |
| 4,752,796 | 6/1988 | Tsukahara et al. | 354/187 |
| 4,843,411 | 6/1989 | Wakabayashi et al. | 354/187 |
| 4,944,030 | 7/1990 | Haraguchi et al. | 354/288 X |
| 4,989,027 | 1/1991 | Ishii et al. | 354/253 |

FOREIGN PATENT DOCUMENTS 2230354 10/1990 United Kingdom .

Primary Examiner—L. T. Hix
Assistant Examiner—J. K. Han
Attorney, Agent, or Firm—Sandler, Greenblum & Bernstein

[57] ABSTRACT

A barrier apparatus of a camera includes a barrier unit which has barrier blades which are biased in a direction to close a photographing aperture, and an operational portion which opens the barrier blades against the biasing force. A lens barrel is provided to which the barrier blades are mounted and which is moved in an optical axis direction between a photographing position and a retracted position. A barrier driving member, which is moved to a disengagement position, in which it is disengaged from the operational portion of the barrier unit when the lens barrel is in the retracted position. The driving member moves the operational portion in a direction to open the barrier blades in the photographing position. The barrier driving member is continuously biased in a direction so as to open the barrier blades, with a driving member engaging mechanism which holds the barrier driving member in the disengagement position against the biasing force applied thereto being adapted to disengage the barrier driving member from the operational portion before the barrier unit is mounted to the lens barrel in the photographing position. A disengagement member releases engagement of the barrier driving member with the driving member when the barrier unit is mounted to the lens barrel.

8 Claims, 3 Drawing Sheets

BARRIER APPARATUS OF CAMERA

BACKGROUND OF THE INVENTION

1. Field of the Invention

The present invention relates to a barrier apparatus of a camera for opening and closing a photographing opening of a lens barrel.

2. Description of the Related Art

A recent camera has a barrier apparatus (barrier unit) incorporated therein for opening and closing a photographing opening. The barrier unit is mounted to the front end of a lens barrel which is movable in an optical axis direction between a photographing position in which the barrier is opened and a retracted position in which the barrier is closed. In the retracted position, the lens barrel is retracted to a rearmost position within a camera body. In the photographing position in which a picture can be taken, the lens barrel is advanced forwardly from the retracted position to open the lens opening.

There are two types of barrier units, i.e., a normally open type and a normally closed type. In the normally open type of barrier unit, the photographing opening is normally opened by a spring when the barrier unit is not attached to the lens barrel. When the barrier unit is attached to the lens barrel, the barrier is closed if a load is applied to the barrier in the retracted position and is opened if no load is applied to the barrier in the photographing position.

In the normally closed type of barrier unit the photographing opening is normally closed by a spring when the barrier unit is not attached to the lens barrel. When the barrier unit is attached to the lens barrel, the barrier is opened if a load is applied to the barrier in the photographing position and is closed if no load is applied to the barrier in the retracted position.

It is quite easy to attach the normally closed type of barrier unit to the lens barrel if the lens barrel is positioned at the retracted position upon assembly. However, in practice there is a necessity to attach the normally closed type of barrier unit to the lens barrel at the photographing position of the lens barrel. For example, if the attachment of the normally closed type of barrier unit is performed at the retracted position, there is a possibility that the light intercepting block, which closes a gap between the inner peripheral surface of the immovable lens barrel which surrounds the lens barrel and the outer peripheral surface of the lens barrel may be clipped, thus resulting in a decreased light intercepting effect. Accordingly, the attachment is a time consuming operation. In view of this, the normally closed type of barrier unit should be mounted to the lens barrel in the photographing position rather than the retracted position.

SUMMARY OF THE INVENTION

The primary object of the present invention is to provide a barrier apparatus of a camera in which a normally closed type barrier unit can be easily mounted to a lens barrel in the photographing position.

To achieve the object mentioned above, according to the present invention, there is provided a barrier apparatus of a camera including a barrier unit which has barrier blades which are biased in a direction to close a photographing opening and an operational portion which opens the barrier blades against the biasing force. A lens barrel to which the barrier unit is mounted and which is moved in an optical axis direction between a photographing position and a retracted position. A barrier driving member is also provided which is moved to a disengagement position in which it is disengaged from the operational portion of the barrier unit when the lens barrel is in the retracted position, and which moves the operational portion in a direction to open the barrier blades in the photographing position. The barrier driving member is continuously biased in a direction so as to open the barrier blades. The barrier apparatus comprises a driving member engaging mechanism which holds the barrier driving member in the disengagement position against the biasing force applied thereto to disengage the barrier driving member from the operational portion before the barrier unit is mounted to the lens barrel in the photographing position, and a disengagement member which releases the engagement of the barrier driving member with the driving member engaging mechanisms when the barrier unit is mounted to the lens barrel.

With this arrangement, since the barrier unit is mounted to the lens barrel after the barrier driving member is moved and kept in a disengagement position in which the barrier driving member is disengaged from the operational portion, the barrier driving member can be easily and functionally connected to the barrier blades in the photographing position.

BRIEF DESCRIPTION OF THE DRAWINGS

The invention will be described below in detail with reference to the accompanying drawings, in which.

DESCRIPTION OF THE PREFERRED EMBODIMENTS

Figure 1:
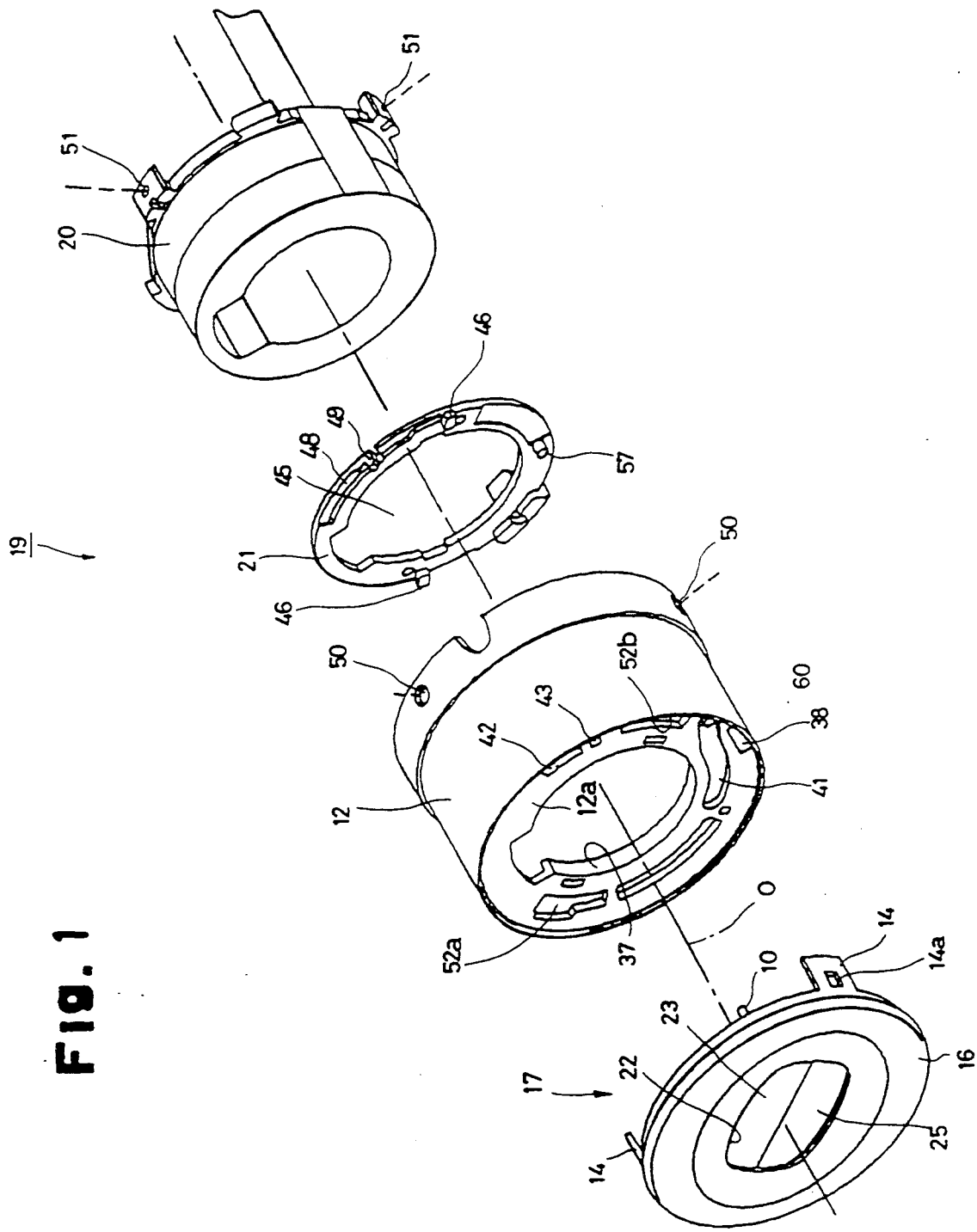
FIG. 1 is an exploded perspective view of a lens assembly according to the present invention.

In FIG. 1, which shows a whole lens assembly 19 to which the present invention is applied, the left side of the drawing corresponds to the front of the optical axis "O". The lens assembly 19 is mounted to a camera body and has a lens barrel 12 at the front portion thereof. An annular barrier driving member 21 and a lens shutter mechanism 20 are inserted in the lens barrel 12 from the rear side thereof. A normally closed type barrier unit 17 is mounted to the front end of the lens barrel 12.

Figure 3:
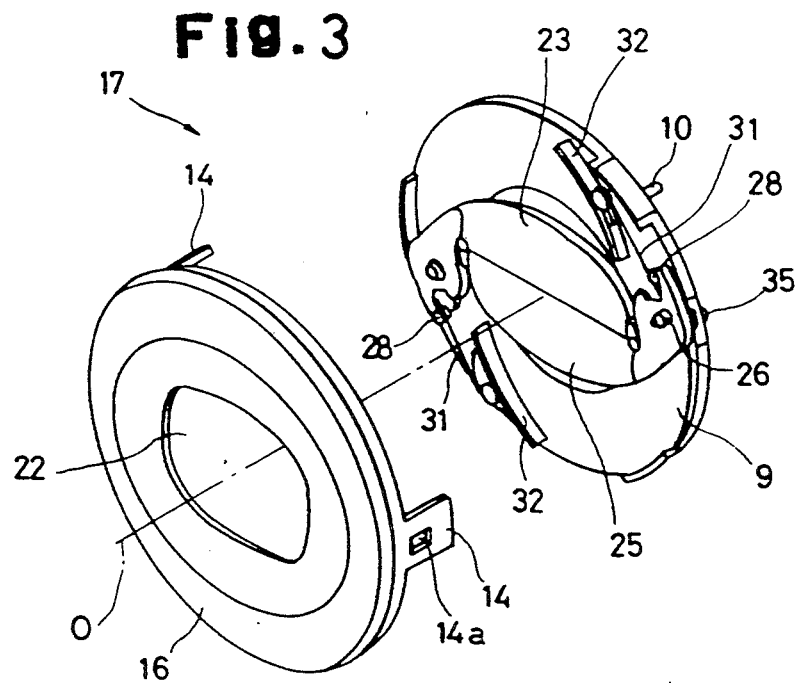
FIG. 3 is a perspective view of a decorative plate and a unit frame to which the decorative plate is mounted.

The barrier unit 17 has a decorative plate 16 which has at its center a photographing opening (lens opening) 22, as can be seen in FIGS. 1 and 3. The decorative plate 16 has three engaging projections 14 which project rearwardly to surround the photographing opening 22.

Figure 2:
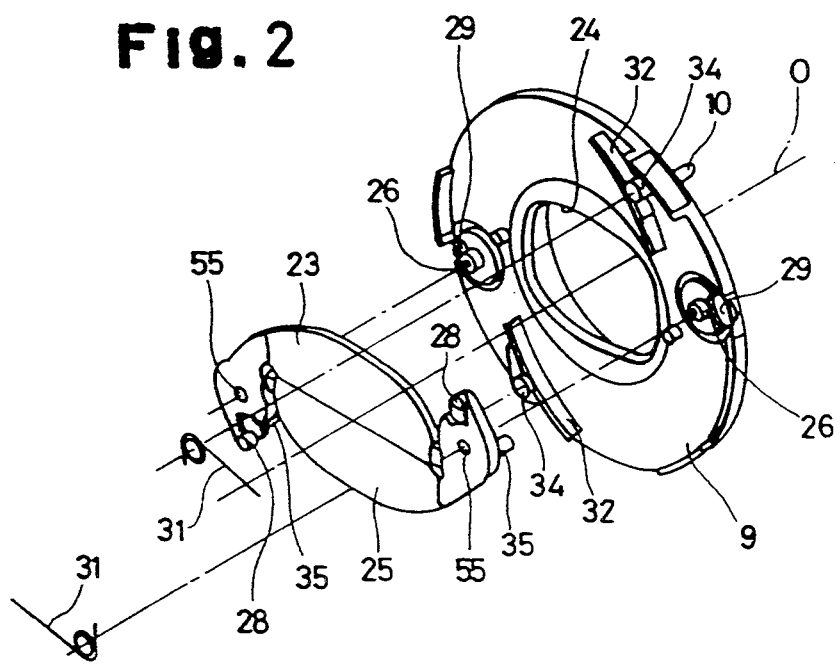
FIG. 2 is an exploded perspective view of a barrier unit according to the present invention.

The barrier unit 17 has a unit frame 9 having an opening 24 corresponding to the photographing opening 22, as shown in FIGS. 2 and 3. The unit frame 9 has right and left pivot shafts 26 on the opposite sides of the opening 22, and right and left through holes 29 which extend through the unit frame 9 adjacent to the pivot shafts 26. Two barrier blades 23 and 25, which are symmetrical to each other with respect to the optical axis O, have operational projections 35, pivot holes 55, and spring receiving projections 28. The pivot shafts 26 of the unit frame 9 are rotatably fitted in the associated pivot holes 55 of the barrier blades 23 and 25, so that the operational projections 35 extend through the through holes 29 to project outwardly from the rear face of the unit frame 9. The unit frame 9 is provided on its rear face with a disengaging projection (disengaging member) 10 corresponding to an engaging hole 43 of the lens barrel 12.

Figure 4:
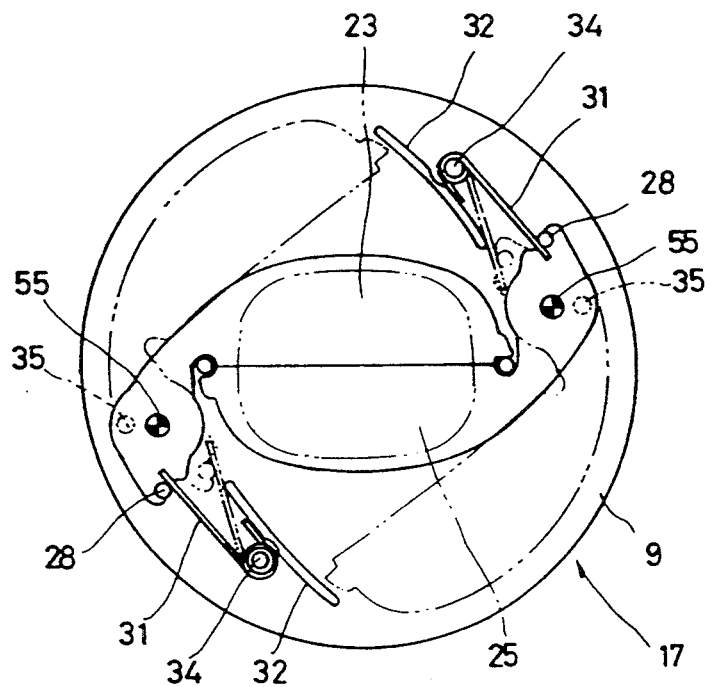
FIG. 4 front elevation view of a barrier unit according to the present invention; and, FIG. 5 front elevation view of a lens barrel according to the present invention.

The unit frame 9 has arched projecting wall members 32 and supporting projections 34 adjacent thereto The arched projecting wall members 32 and supporting projections 34 are located in a symmetrical arrangement with respect to the optical axis 0. Torsion springs 31 are held by the supporting projections 34 (FIG. 4). The torsion springs 31 abuts at their one end upon the outer side of the projecting wall members 32 and at the other ends upon the spring receiving projections 28. Consequently, the barrier blades 23 and 25 are biased into a light intercepting position of the optical path, i.e., a closed position of the photographing opening.

Figure 5:
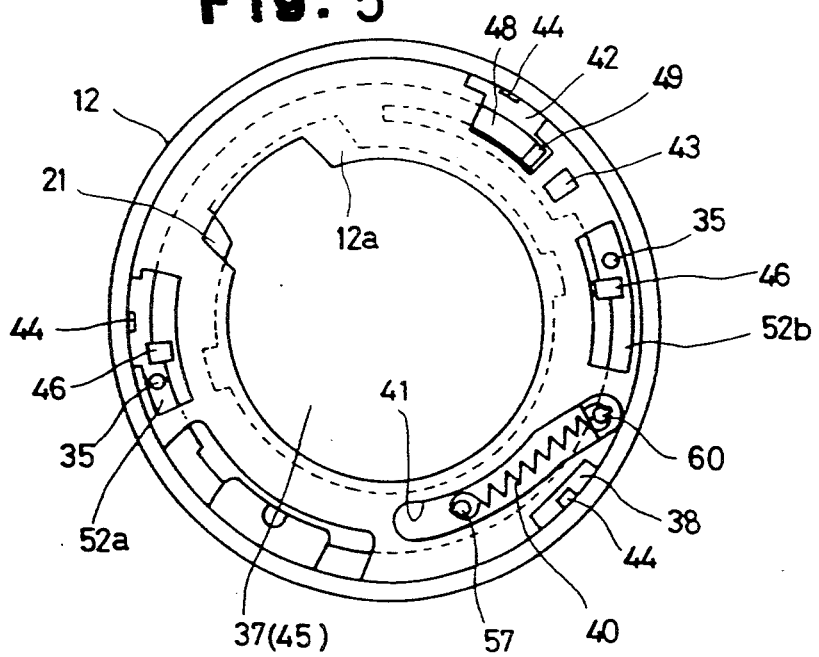

The barrier driving member 21 has a center opening 45 and association projections 46 which are located on the opposite sides of the center opening 45 to engage with the associated operational projections 35 of the barrier blades 23 and 25, as shown in FIGS. 1 and 5. The barrier driving member 21 also has a biasing force transmitting projection 57 between the right and left association projections 46. The barrier driving member 21 has an engaging claw 49 between the right and left association projections 46 and opposite to the biasing force transmitting projection 57. The engaging claw 49 is provided on a front end of an elastically deformable thinned portion 48 of the barrier driving member 21 which archwise extends along the outer periphery of the barrier driving member 21. The engaging claw 49 normally projects forwardly from the front face of the barrier driving member 21. The engaging claw 49 can be elastically deflected rearwardly due to the elasticity of the elastically deformable thinned portion 48.

The lens barrel 12 has a forwardly projecting front peripheral edge and an inner flange 12a. The center lens opening 37 is formed on the inner flange 12a. A loose hole 42, an engaging groove 52a and a recessed groove 38, corresponding to the three engaging projections 14, two of which are shown in FIGS. 1 and 3, of the decorative plate 16, are also formed on the inner flange 12a. In the loose hole 42, the engaging groove 52a and recessed groove 38, are provided engaging claws 44 which are engaged in angled holes 14a of the associated engaging projections 14 to be integral with the peripheral surface of the lens barrel 12. The lens barrel 12 is provided on its inner flange 12a with an engaging groove 52b which is opposite to the engaging groove 52a between the loose hole 42 and the recessed groove 38. A spring receiving groove 41 is formed between the engaging grooves 52a and 52b. Between the engaging groove 52b and the loose hole 42 an engaging hole 43 is formed the engaging claw 49 is engaged and which constitutes one of the most significant features of the present invention.

The loose hole 42 and the pair of engaging grooves 52a and 52b are formed archwise along the outer periphery of the lens barrel 12. When the associated engaging claw 49 is inserted in the loose hole 42, the engaging claw 49 is moved along the periphery of the lens barrel 12. The operational projections 35 and the association projections are movably inserted in the engaging grooves 52a and 52b from front and behind, respectively.

The spring receiving groove 41 formed between the pair of engaging grooves 52a and 52b is provided on its one end with a supporting projection 60 which is engaged by one end of a spring 40 for the barrier driving member 26. A biasing force transmitting projection 57 is inserted in the spring receiving groove 41 from behind, so that the other end of the spring 40 is connected to the biasing force transmitting projection 57. Note that blocks (not shown) are provided on the inner peripheral surface of the immovable lens barrel of the camera which surrounds the lens barrel 12 when the lens barrel 12 is mounted to the camera, to intercept light which otherwise would pass through a gap between the outer peripheral surface of the lens barrel 12 and the inner peripheral surface of the immovable lens barrel.

The barrier apparatus mentioned above can be assembled as follows. First, the barrier blades 23 and 25 are symmetrically opposed to each other with respect to the optical axis (center of photographing opening 22), so that the pivot shafts 26 are fitted in the associated pivot holes 55 and the operational projections 35 are fitted in the associated through holes 29. The ends of the torsion springs 31 which are supported at their other ends by the supporting projections 34 are engaged on the spring receiving projections 28. Thereafter, the barrier unit 17 on which the barrier blades 23 and 25 are rotated in the clockwise direction to be closed is attached to the rear face of the decorative plate 16.

The barrier driving member 21 is fitted in the lens barrel 12 from behind, so that the engaging claw 49 is inserted in the loose hole 42, and so that the biasing force transmitting projection 57 is inserted in the spring receiving groove 41 to be engaged by one end of the spring 40 for the barrier driving member 21. As a result, the barrier driving member 21 is biased to rotate in the counterclockwise direction in FIG. 1. Thereafter, the lens shutter mechanism 20 is fitted in the lens barrel 12 from the rear side of the barrier driving member 21. After the threaded holes 50 of the lens barrel 12 are registered with the threaded holes 51 of the lens shutter mechanism 20, set screws (not shown) are screwed in the threaded holes to secure the lens shutter mechanism 20 to the lens barrel 12. After that, the assembly thus obtained is mounted to a camera body (not shown). Upon attachment of the assembly to the camera body, the lens barrel 12 is advanced in the optical axis direction to be brought into the photographing position, so that the front end of the lens barrel 12 separates from the blocks on the immovable lens barrel side.

In this state, the barrier driving member 21 is rotated in the clockwise direction against the spring 40 for the barrier driving member while manually pushing the engaging claw 49 which projects from the loose hole 42 against the spring force of the elastically deformable portion 48. Then, as soon as the engaging claw 49 is disengaged from the loose hole 42, the engaging claw 49 is engaged in the engaging hole 43. As a result, the barrier driving member 21 is biased to rotate in the counterclockwise direction, and is maintained so as to be ready for the engagement with the operational projections 35.

In this state, the three engaging projections 14 are registered with the loose hole 42, the engaging grooves 52a, and recessed groove 38, respectively, and the disengaging projection 10 is registered with the engaging hole 43 to fit the barrier unit 17 in the lens barrel 12. As a result, the engaging claws 44 are engaged in the angle holes 14a of the engaging projections 14, and at the same time, the disengaging projection 10 disengages the engaging claw 49 rearwardly from the engaging hole 43. In this moment, the brake force which has restricted the rotation of the barrier driving member 21 in the counterclockwise direction disappears, and, accordingly, the barrier driving member 21 is rotated in the counterclockwise direction by the spring 40. Since the association projections 46 are engaged by the operational projections 35 to rotate together, the barrier blades 23 and 25 are rotated about the axes of the pivot shafts 26 in the counterclockwise direction to open the photographing opening (photographing aperture). Thus, the associated projections 46 can be certainly and functionally connected to the operational projections 35 in the photographing position. Namely, the normally closed type barrier unit 17 is attached to the lens barrel 12 at the photographing position.

When the lens barrel 12 is retracted from the photographing position into the retracted position, the barrier driving member 21 is rotated by a driving mechanism (not shown) against the driving spring 40 to disengage the association projections 46 from the operational projections 35. In this state, an engaging means (not shown) engages the barrier driving member 21 therewith at the angular position in which the association projections 46 are disengaged from the operational projections 35, and accordingly, the barrier blades 23 and 25 are positioned in the closed position by the spring 31.

I claim:

1. A barrier apparatus of a camera, said camera including a barrier unit which has barrier blades which are biased in a direction to close a photographing opening, and operational portion which opens the barrier blades against the biasing force, a lens barrel to which said barrier unit is adapted to be mounted and which is moved in an optical axis direction between a photographing position and a retracted position, and a barrier driving member which is moved to a disengagement position in which it is disengaged from said operational portion of said barrier unit when said lens barrel is in the retracted position and which moves said operational portion in a direction to open the barrier blades in the photographing position, said barrier driving member being continuously biased in a direction to open the barrier blades, wherein said apparatus comprises:
   a driving member engaging mechanism which holds said barrier driving member in the disengagement position against the biasing force applied thereto to disengage said barrier driving member from said operational portion before said barrier unit is mounted to said lens barrel in the photographing position; and,
   a disengagement member which releases the engagement of said barrier driving member with the driving member engaging mechanism when said barrier unit is mounted to said lens barrel.

2. A barrier apparatus of a camera according to claim 1, wherein said barrier unit comprises a pair of pivot shafts to which the barrier blades are rotatably mounted in a symmetrical arrangement with respect to the optical axis, and a pair of torsion springs which bias the barrier blades in a direction to close the photographing position.

3. A barrier apparatus of a camera according to claim 1, wherein said barrier unit comprises a decorative plate which is mounted to the front end of said lens barrel.

4. A barrier apparatus of a camera according to claim 3, wherein said decorative plate has a plurality of engaging projections which have angled holes which are adapted to be engaged by said lens barrel.

5. A barrier apparatus of a camera according to claim 1, wherein said operational portion comprises operational projections provided on the barrier blades.

6. A barrier apparatus of a camera according to claim 1, wherein said driving member engagement mechanism comprises at least one engaging hole formed on said lens barrel and at least one engaging claw which is provided on said barrier driving member.

7. A barrier apparatus of a camera according to claim 6, wherein said disengagement member is a disengaging projection which is provided on said barrier unit at a position corresponding to said engaging hole.

8. A barrier apparatus of a camera comprising:
   a barrier unit having a plurality of barrier blades which are biased in a direction to selectively close a photographing opening;
   an operational member which opens the barrier blades against the biasing force, said member being positioned in the barrier block;
   a lens barrel to which the barrier unit is adapted to be mounted, said lens barrel being movable in an optical axis direction, between a photographing position and a retracted position;
   a barrier driving member provided in said lens barrel, said barrier driving member adapted to move to open the barrier blades through the operational member against the biasing force of said barrier driving member in accordance with movement of said lens barrel;
   a disengagement mechanism which is adapted to maintain said barrier driving member at a position at which said barrier driving member does not engage said operational member, before said barrier unit is mounted to said lens barrel positioned at the photographing position; and
   an opening mechanism which engages said barrier driving member and said operational member when said barrier unit is mounted to said lens barrel at the photographing position.

* * * * *

UNITED STATES PATENT AND TRADEMARK OFFICE
CERTIFICATE OF CORRECTION

PATENT NO. : 5,136,315
DATED : August 4, 1992
INVENTOR(S) : H. NOMURA

It is certified that error appears in the above-indentified patent and that said Letters Patent is hereby corrected as shown below:

At column 5, line 35 (claim 1, line 4) change "and" to ---an---.
    At column 6, line 52 (claim 8, line 24) change "opening" to ---engaging---.

Signed and Sealed this

Twenty-ninth Day of August, 1995

Attest:

BRUCE LEHMAN

*Attesting Officer*      *Commissioner of Patents and Trademarks*